(12) United States Patent
Huang

(10) Patent No.: US 11,042,217 B2
(45) Date of Patent: Jun. 22, 2021

(54) CALIBRATION METHOD AND APPARATUS, TERMINAL EQUIPMENT AND STORAGE MEDIUM

(71) Applicant: BEIJING 7INVENSUN TECHNOLOGY CO., LTD., Beijing (CN)

(72) Inventor: Tongbing Huang, Beijing (CN)

(73) Assignee: BEIJING 7INVENSUN TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/533,292

(22) Filed: Aug. 6, 2019

(65) Prior Publication Data

US 2020/0142478 A1 May 7, 2020

(30) Foreign Application Priority Data

Nov. 6, 2018 (CN) .......................... 201811311763.2

(51) Int. Cl.
| | |
|---|---|
| G09G 5/00 | (2006.01) |
| G06F 3/01 | (2006.01) |
| G02B 27/00 | (2006.01) |
| G02B 27/32 | (2006.01) |
| G06K 9/00 | (2006.01) |
| G02B 27/01 | (2006.01) |

(52) U.S. Cl.
CPC .......... *G06F 3/013* (2013.01); *G02B 27/0093* (2013.01); *G02B 27/32* (2013.01); *G06K 9/00604* (2013.01); *G02B 2027/0198* (2013.01)

(58) Field of Classification Search
CPC ........ G02B 2027/0198; G02B 27/0093; G02B 27/32; G06F 3/013; G06K 9/00604
See application file for complete search history.

(56) References Cited

U.S. PATENT DOCUMENTS

| | | | |
|---|---|---|---|
| 2014/0055337 A1* | 2/2014 | Karlsson | ................. G06F 3/013 345/156 |
| 2014/0098198 A1* | 4/2014 | Lee | .......................... G06F 3/013 348/48 |
| 2016/0139665 A1 | 5/2016 | Lopez et al. | |

FOREIGN PATENT DOCUMENTS

| | | |
|---|---|---|
| CN | 102760198 A | 10/2012 |
| CN | 105760795 A | 7/2016 |
| CN | 107422842 A | 12/2017 |
| CN | 108700934 A | 10/2018 |
| WO | 2017130514 A1 | 8/2017 |

OTHER PUBLICATIONS

Extended European Search report issued in European Application No. 19200376.2, dated Mar. 11, 2020. 12 pages.

* cited by examiner

*Primary Examiner* — Insa Sadio
(74) *Attorney, Agent, or Firm* — Brown Rudnick LLP

(57) ABSTRACT

Provided are a calibration method and apparatus, terminal equipment and computer readable storage medium. The calibration method includes: acquiring user information, wherein the user information is used for determining calibrated information; sending the user information and calibration marking information to a server; and receiving the calibrated information from the server.

17 Claims, 10 Drawing Sheets

CALIBRATION METHOD AND APPARATUS, TERMINAL EQUIPMENT AND STORAGE MEDIUM

CROSS-REFERENCE TO RELATED APPLICATIONS

This application claims priority to Chinese patent application No. 201811311763.2 filed with the Patent Office of the People's Republic of China on Nov. 6, 2018, the disclosure of which is incorporated herein by reference in its entirety.

TECHNICAL FIELD

The embodiments of the present disclosure relate to the field of eye-tracking technology and, in particular, relates to a calibration method and apparatus, terminal equipment and storage medium.

BACKGROUND

With the development of human-machine interaction technology, eye-tracking technology has been widely used. Eye-tracking, also known as gaze tracking, is a machine vision technology. In this technology, an eye image of a user is captured through a device, the eye image is analyzed using an algorithm, and gaze point of the user is obtained finally.

In a case where the user first use an eye-tracking product for assistive communication, experimental analysis or games, the gaze point of the user needs to be calibrated to ensure the accuracy in use of the eye-tracking product. In a process of gaze point calibration, a terminal equipment is required to acquire data when the user stares at multiple calibration points on a display screen, and calibrate the gaze point based on the acquired data.

When the gaze point is calibrated, hardware resources of the terminal equipment should be occupied for image processing, and tracking and calculating of the gaze point. Therefore, in a case where the user first uses the eye-tracking product, when the terminal equipment calibrates the gaze point, the terminal equipment cannot operate as smoothly as the case where the eye-tracking product is not used. Lag may occur and user experience is decreased.

SUMMARY

The embodiments of the disclosure provides a calibration method and apparatus, terminal equipment, storage medium, so that a processing speed of a terminal equipment in the gaze point calibration is improved significantly in a case where a user first uses an eye-tracking product.

In the first aspect, an embodiment of the present disclosure provides a calibration method. The calibration method includes steps described below.

User information is acquired. The user information is used for determining calibrated information.

The user information and calibration marking information are sent to a server.

The calibrated information from the server is received.

In the second aspect, an embodiment of the present disclosure provides a calibration method. The calibration method includes steps described below.

User information and calibration marking information sent by a terminal equipment are received.

Calibrated information is determined according to the user information and the calibration marking information.

The calibrated information is sent to the terminal equipment.

In the third aspect, an embodiment of the present disclosure provides a calibration method. The calibration method includes steps described below.

A terminal equipment acquires user information. The user information is used for determining calibrated information.

The terminal equipment sends the user information and calibration marking information to a server.

The server receives the user information and the calibration marking information sent by the terminal equipment.

The server determines the calibrated information according to the user information and the calibration marking information, and sends the calibrated information to the terminal equipment.

The terminal equipment receives the calibrated information.

In the fourth aspect, an embodiment of the present disclosure provides a calibration apparatus.

The calibration apparatus includes an information acquisition module, an information sending module and a result reception module.

The information acquisition module is configured to acquire user information. The user information is used for determining calibrated information.

The information sending module is configured to send the user information and calibration marking information to a server.

The result reception module is configured to receive the calibrated information from the server.

In the fifth aspect, an embodiment of the present disclosure provides a calibration apparatus.

The calibration apparatus includes an information reception module, a result determination module and a result sending module.

The information reception module is configured to receive user information and calibration marking information sent by a terminal equipment.

The result determination module is configured to determine calibrated information according to the user information and the calibration marking information.

The result sending module is configured to send the calibrated information to the terminal equipment.

In the sixth aspect, an embodiment of the present disclosure provides a terminal equipment. The terminal equipment includes at least one processor, a storage device, an eye-tracking device, a communication device and a display device.

The storage device is configured to store at least one program. The at least one program, when executed by the at least one processor, causes the at least one processor to implement the calibration method provided by the first aspect above.

The eye-tracking device is configured to acquire user information. The eye-tracking device is connected to the processor and the storage device respectively.

The communication device is configured to send the user information and calibration marking information to a server, and receive calibrated information from the server. The communication device is connected to the processor and the storage device respectively.

The display device is configured to display a marker, a calibration point and an initial calibration interface. The display device is connected to the processor and the storage device respectively.

In the seventh aspect, an embodiment of the present disclosure provides a server. The server includes at least one processor, a storage device and a data communication device.

The storage device is configured to store at least one program. The at least one program, when executed by the at least one processor, causes the at least one processor to implement the calibration method provided by the second aspect above.

The data communication device is configured to receive user information and calibration marking information sent by a terminal equipment, and send calibrated information to the terminal equipment. The data communication device is connected to the processor and the storage device respectively.

In the eighth aspect, an embodiment of the present disclosure provides a computer readable storage medium. Computer programs are stored in the computer readable storage medium. The computer programs, when executed by a processor, implement the calibration method provided by the first aspect above.

In the ninth aspect, an embodiment of the present disclosure provides a computer readable storage medium. Computer programs are stored in the computer readable storage medium. The computer programs, when executed by a processor, implement the calibration method provided by the second aspect above.

The embodiments of present disclosure provide the calibration method and apparatus, terminal equipment and storage medium. Through the embodiments of the present disclosure, the user information when the user looks at the calibration point may be acquired; the user information and the calibration marking information corresponding to the user information are sent to the server, allowing the server to determine the calibrated information based on the user information and the calibration marking information; the calibrated information from the server is received to complete the gaze point calibration. The calibration method significantly saves computing resources of the terminal equipment, increases the processing efficiency of the terminal equipment, and improves user experience in use of the terminal equipment. In addition, calibration calculation through the server can facilitate the upgrade of a calibration algorithm. Meanwhile, the calibration algorithm is stored in the server, significantly increasing the confidentiality of the calibration algorithm.

DETAILED DESCRIPTION

Figure 1A:
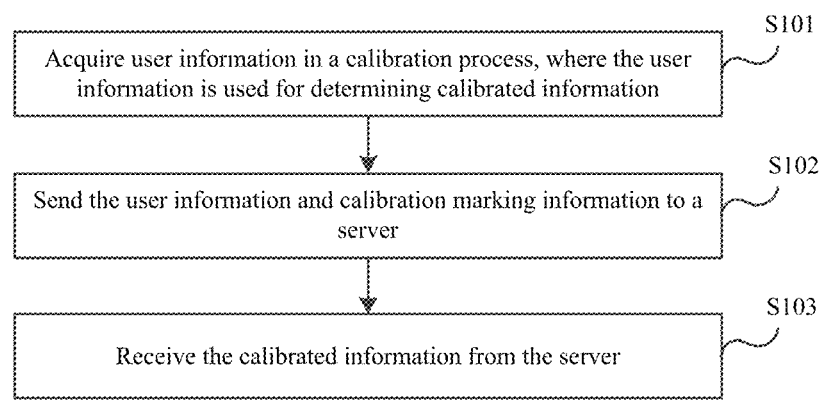
FIG. 1A is a flowchart of a calibration method provided by an embodiment 1 of the present disclosure.

The present disclosure will be further described in detail hereinafter in conjunction with drawings and embodiments. It may be understood that the specific embodiments described herein are used only for interpreting the present disclosure and not for limiting the present disclosure. In addition, it should be noted that, for ease of description, the drawings only shows a part related to the present disclosure, not the whole structure of the present disclosure.

It should be mentioned that, before discussion of exemplary embodiments in further detail, some exemplary embodiments are described as processes or methods depicted in the form of flowcharts. Although the flowcharts describe operations (or steps) in sequence, many of these operations may be implemented in parallel, concurrently, or simultaneously. In addition, the order of the operations may be rearranged. The processes may be terminated when the operations are completed, but the exemplary embodiments may also have additional steps not included in the drawings. The processes may correspond to methods, functions, procedures, subroutines, subprogram, etc.

Embodiment 1

FIG. 1A is a flowchart of a calibration method provided by the embodiment 1 of the present disclosure. The calibration method may be applied to calibration before a user uses an eye-tracking product. More specifically, the calibration method may be applied to gaze point calibration before the user uses the eye-tracking product. The calibration method may be performed by a calibration apparatus. The calibration apparatus may be implemented by software and/or hardware, and is generally integrated into a terminal equipment. In this embodiment, the terminal equipment includes, but is not limited to, a computer, a personal digital assistant (PDA), a mobile phone, etc.

At present, when the user first use the eye-tracking product, hardware resources of the terminal equipment should be occupied for image processing, and tracking and calculating of the gaze point. This requires use of local computing resources in a local computer (for example, a computer with the eye-tracking product integrated) of the user for the image processing and the gaze point tracking. Such an approach requires that the local computer of the user has high hardware configuration; otherwise it will cause user resource occupation, computer lag, slow response, unsatisfactory user experience, etc. If better user experience is required, a new hardware device should be purchased or the existing hardware device should be upgraded. This increases access threshold for the user. Moreover, the confidentiality of eye gaze tracking algorithm (i.e. calibration algorithm) is reduced. When the user uses the eye-tracking technology, all files should be stored in the local computer of the user, and each local computer of the user may have one copy of all files, so that the confidentiality is reduced. In addition, when the eye gaze tracking algorithm is upgraded, the user needs to download the corresponding eye fixation tracking algorithm from a designated location, which not only increases the difficulty for the user to use, but also reduces the confidentiality of eye-tracking technology algorithm.

As shown in FIG. 1A, the embodiment 1 of the present disclosure provides a calibration method. The calibration method includes steps described below.

In S101, user information in a calibration process is acquired, where the user information is used for determining calibrated information.

In general, when the user first uses the eye-tracking product, the gaze point needs to be calibrated. In this embodiment, the calibration process may be understood as the gaze point calibration process performed by the eye-tracking product. The calibration process works by displaying a calibration marking such as calibration points, a calibration area or a calibration track on a display device for the user to stare at. In order to facilitate the user to stare at the calibration points, the calibration points may be arranged to form concentric circles, and a cross may be displayed at the center of the concentric circles. The user information may be understood as feature data of the user in the calibration process. The feature data may be used for determining actual gaze points, an actual fixation area or an actual fixation track when the user looks at the calibration points, the calibration area or the calibration track. The actual gaze points may be understood as points that the user actually looks at on the display device in the calibration process.

The user information may include eye feature information and user location information. The user information may also include only the eye feature information. The eye feature information may be understood as eye data acquired by an eye-tracking device in the calibration process.

The user location information may be understood as a location of the user relative to the eye-tracking product in the calibration process.

For different types of calibration marking in the calibration process, the user information acquired in this step may be different. For example, when the calibration marking is the calibration points, the user information may be the eye feature information when the user looks at the calibration points; when the calibration marking is the calibration track, the user information may be the eye feature information within preset time.

In this step, the approach of acquiring the user information is not limited. In general, a user image may be acquired by an image acquisition device at first, and then the user image and a pre-stored reference image may be analyzed to acquire the user location information. The user location information may also be acquired by a position sensor. In acquisition of eye feature information of the user, the movement of eyes may be calculated by using a pupillary-corneal reflex method, or by means of a contact or non-contact sensor (such as an electrode or a capacitive sensor).

In an embodiment, in this step, the eye feature information of the user may be acquired by the eye-tracking device. The eye-tracking device may be understood as a device that acquires an eye feature of the user to track eyes of the user. The eye-tracking device may be an eye tracker, a camera or a video camera. The eye feature information may include at least one of eye image information, a pupil position, a pupil shape, an iris position, an iris shape, an eyelid position, a canthus position or a spot (also known as Purkinje spot) position.

It may be understood that feature information of user eyes may include at least one of feature information of the left eye of the user or feature information of the right eye of the user.

In this embodiment, when a different user first uses the eye-tracking product, the eye-tracking product will be triggered to enter a calibration mode to calibrate the gaze point of the user. It may be understood that the eye-tracking product may authenticate the user to determine whether the user is a first-time user. For example, the eye-tracking product may determine the identity of the user based on a login identifier when the user logs in to the eye-tracking product. The eye-tracking product may also determine the identity of the user based on user marking information such as at least of an iris feature, a fingerprint feature or a voice print feature. When the user is a first-time user, the eye-tracking product may directly enter the calibration mode.

In S102, the user information and calibration marking information are sent to a server.

In this embodiment, the calibration marking information may be understood as data used for identifying the calibration marking. The calibration marking information may include location information and depth information of the calibration marking. The calibration marking may be the calibration points, the calibration area or the calibration track.

The server may be understood as a device that communicates to the terminal equipment. The server may receive the user information and the calibration marking information to assist the terminal equipment to complete a calibration calculation.

In this step, after the user information in the calibration process is acquired, the user information and the calibration marking information may be sent to the server, and the server may conduct the calibration calculation based on the received user information and the calibration marking information. This may significantly save the computing resources of the terminal equipment. It may be understood that a communication connection may always exist between the terminal equipment and the server. After the terminal equipment acquires the user information, a communication connection request may be sent to the server to establish the communication connection between the terminal equipment and the server.

In S103, the calibrated information from the server is received.

In this embodiment, the calibrated information may be understood as data returned by the server after the calibration. The calibrated information may include at least one of a calibration result, a calibrated image or a next operation interface.

In this embodiment, it may be understood that different operations may be performed after the calibrated information from the server is received based on different content included in the calibrated information. That is, the calibrated information may be stored or displayed to the user.

After the calibration, the user may use the calibrated eye-tracking product for assistive communication.

Specifically, the calibrated information may or may not include the calibration result. When the calibrated information includes the calibration result, the user may use the eye-tracking product to track the gaze point based on the calibrated information, so as to implement interaction between the eyes of the user and the display device. In general, the calibration result in the calibrated information may include the correspondence among actual gaze points (i.e. the gaze points based on the eye feature information of the user), the user location information and the calibration points. Every time the user uses the eye-tracking product, the calibrated gaze point may be used for human-machine interaction based on the correspondence. When the calibrated information does not include the calibration result, the terminal equipment may only acquire the eye feature information of the user when conducting the gaze tracking by means of the eye-tracking product, and the gaze point is determined by the server based on the calibration result to implement the human-machine interaction.

Figure 1B:
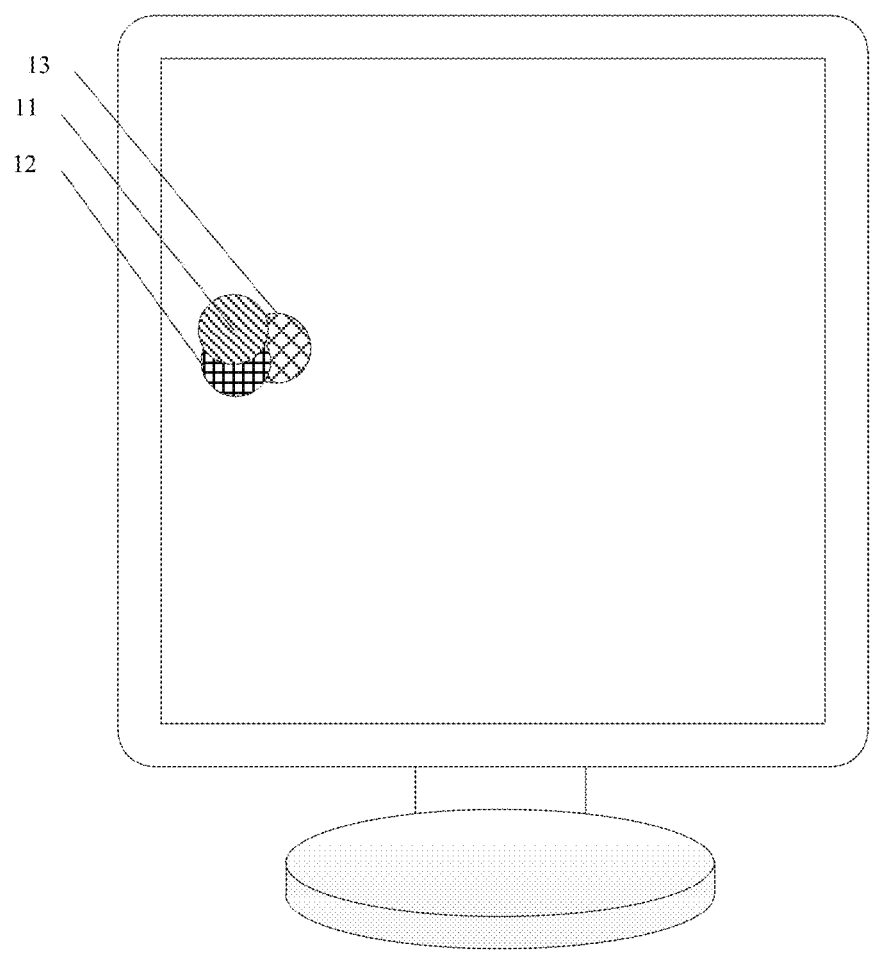
FIG. 1B is a schematic diagram illustrating display of calibrated information provided by the embodiment 1 of the present disclosure.

FIG. 1B is a schematic diagram illustrating display of calibrated information provided by the embodiment 1 of the present disclosure. The calibrated information shown in FIG. 1B may be correspondence between the actual gaze points and the calibration points. As shown in FIG. 1B, a position relation among a calibration point 11, an actual gaze point 12 of the left eye and an actual gaze point 13 of the right eye is shown. It may be understood that only one calibration point 11 is taken as an example in FIG. 1B, and correspondence between all calibration points and corresponding actual gaze points (i.e. the actual gaze points of the left eye and the actual gaze points of the right eye) is not shown.

The embodiment 1 of the present disclosure provides the calibration method. Through the above calibration method, the user information in the calibration process may be acquired; the user information and the calibration marking information corresponding to the user information are sent to the server, allowing the server to determine the calibrated information based on the user information and the calibration marking information corresponding to the user information; the calibrated information from the server is received to complete the gaze point calibration. The calibration method significantly saves the computing resources of the terminal equipment, reduces hardware usage standards, increases the processing efficiency of the terminal equipment, and improves user experience in use of the terminal equipment. In addition, calibration calculation through the server can facilitate the upgrade of a calibration algorithm. Meanwhile, the calibration algorithm is stored in the server, significantly increasing the confidentiality of the calibration algorithm.

Embodiment 2

Figure 2A:
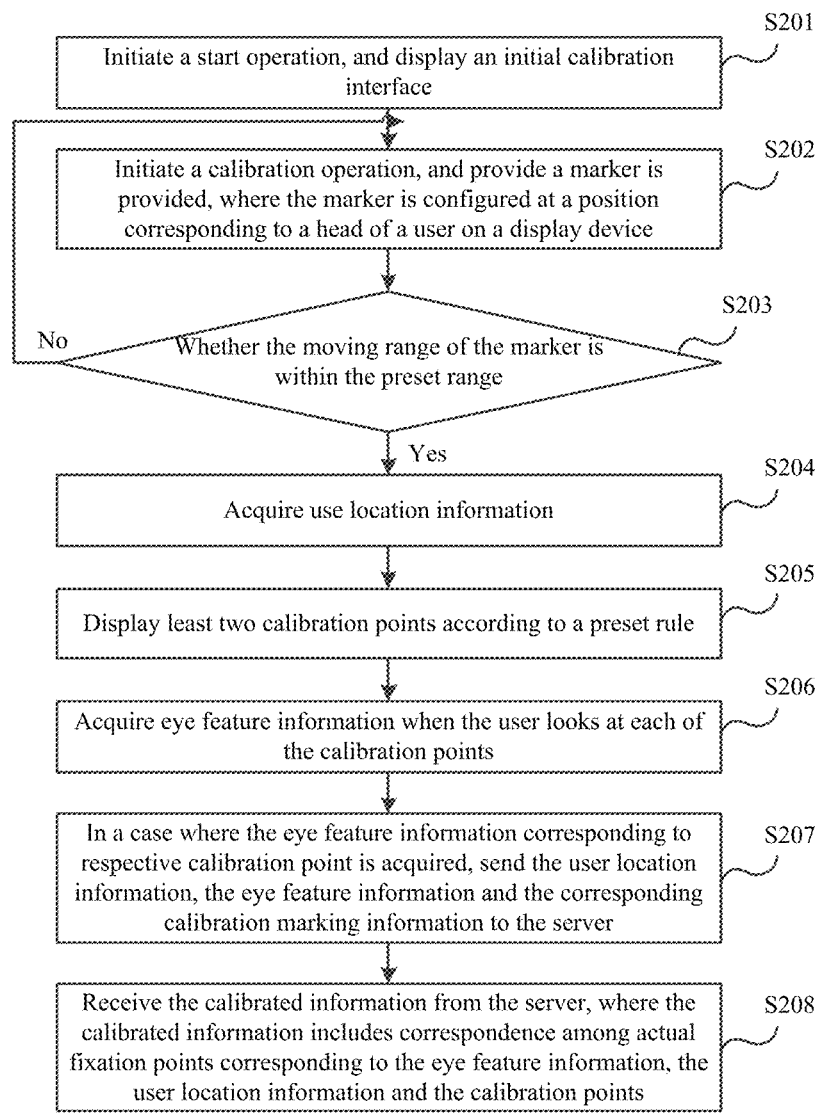
FIG. 2A is a flowchart of a calibration method provided by an embodiment 2 of the present disclosure.

FIG. 2A is a flowchart of a calibration method provided by the embodiment 2 of the present disclosure. The embodiment 2 is obtained from optimization on the basis of the above embodiments. In this embodiment, before the user information in the calibration process is acquired, the calibration method is optimized to include following steps: a calibration operation is initiated, and a marker is provided, where the marker is configured at a position corresponding to a head of a user on a display device; when a moving range of the marker is within a preset range, user location information is acquired.

Further, in this embodiment, the step in which the user information in the calibration process is acquired is further optimized to include following steps: at least two calibration points are displayed according to a preset rule; eye feature information when the user looks at each of the calibration points is acquired.

On the basis of the above optimization, in this embodiment, the step in which the user information and the calibration marking information are sent to the server is specifically optimized to include following steps: when the eye feature information corresponding to respective calibration points is acquired, the user location information, the eye feature information and the corresponding calibration marking information are sent to the server. The calibrated information includes correspondence among actual gaze points corresponding to the eye feature information, the user location information and the calibration points.

Further, in this embodiment, before the user information in the calibration process is acquired, the calibration method is optimized to include following steps: a start operation is initiated, and an initial calibration interface is displayed. The details not mentioned in this embodiment may be seen with reference to the embodiment 1.

As shown in FIG. 2A, the embodiment 2 of the present disclosure provides a calibration method.

The calibration method includes steps described below.

In S201, a start operation is initiated, and an initial calibration interface is displayed.

In this embodiment, the start operation may be triggered by an initiation instruction. The initiation instruction may be understood as a command to initiate calibration. The initial calibration interface may be understood as the first operation interface for the calibration. The initial calibration interface may include a calibration prompt. The calibration prompt may be understood as prompt information for the user to view.

In general, the initiation instruction may be an instruction triggered by the user through a corresponding key. The initiation instruction may also be an instruction triggered by identification based on the identity information of the user. The identity information of the user may be identified based on at least one of a login identifier, an iris feature, a voice print feature or a fingerprint feature of the user. The initiation instruction may be triggered when the user is determined to be a first-time user through identification of the identity information of the user.

In this step, after the start operation is initiated based on the initiation instruction, the initial calibration interface may be displayed on the display device for the user to operate.

Figure 2B:
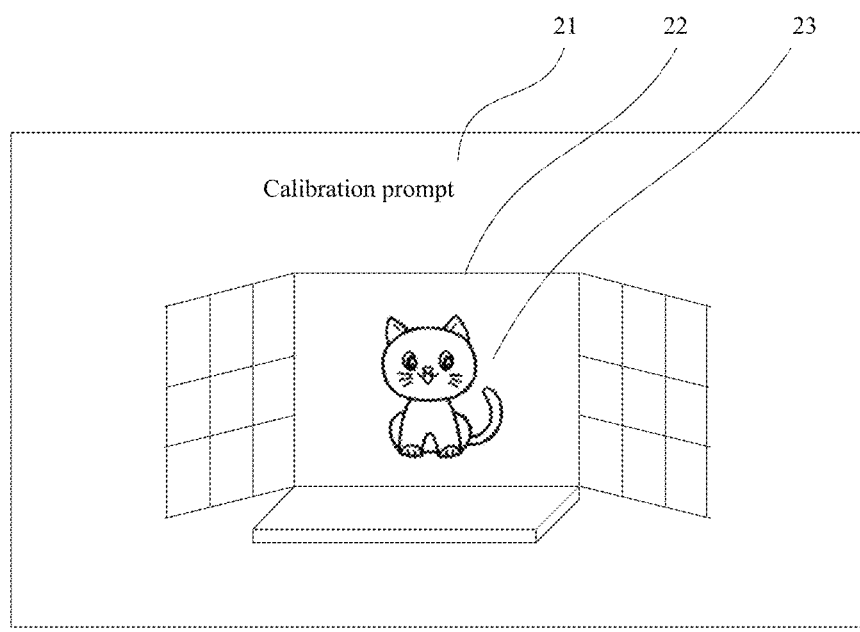
FIG. 2B is a schematic diagram of an initial calibration interface provided by an embodiment 2 of the present disclosure.

FIG. 2B is a schematic diagram of the initial calibration interface provided by the embodiment 2 of the present disclosure. As shown in FIG. 2B, the initial calibration interface includes a calibration prompt 21. The position and content of the calibration prompt 21 are not limited, and those skilled in the art may select the position and content of the calibration prompt 21 according to requirements. For example, the calibration prompt 21 may be located at any blank position in the calibration interface. The specific content of the calibration prompt 21 may be "press any key to start calibration", "press Enter key to start calibration" or "press Space key to start calibration". In addition, the initial calibration interface may also include a position adjustment box 22 and a marker 23. The marker 23 may mark the position of the head of the user, and the position adjustment box 22 may be used for limiting a moving range of the marker 23.

In S202, a calibration operation is initiated, and a marker is provided, where the marker is configured at a position corresponding to a head of a user on a display device.

In this embodiment, the calibration operation may be triggered by a calibration instruction. The calibration instruction may be understood as an instruction to start the calibration. In this embodiment, a calibration mode may be entered first by the initiation instruction during the calibration. When the eye-tracking product is in the calibration mode, the initial calibration interface may be displayed on the display device, allowing the user to determine whether to start the calibration again. When the calibration needs to start, the user may trigger the calibration instruction. The marker may be understood as marking information used for identifying the position of the head of the user in the initial calibration interface.

It may be understood that the calibration instruction may be an instruction triggered by the user through a corresponding key. The calibration instruction may also be an instruction triggered by a voice or eye feature of the user.

In general, in this embodiment, when the calibration is started, a sitting posture of the user should be adjusted first. The sitting posture of the user may be adjusted based on the marker. In this step, the marker may be displayed at the position corresponding to the head of the user on the display device to indicate the current position of the user. The position corresponding to the head of the user on the display device may be a position of the user relative to the display device. As shown in FIG. 2B, the marker 23 may be set at the position corresponding to the head of the user on the display device. The position of the marker 23 changes with the position of the head of the user. It may be understood that the marker 23 may also be set to an acquired user image. The acquired user image is displayed at the corresponding position of the display device to complete the adjustment of the sitting posture of the user.

As shown in FIG. 2B, the calibration may start after the calibration operation is initiated. At the beginning of the calibration, the content of the calibration prompt 21 in the calibration interface may be "determine the moving range of the head of the user: move the head and keep the kitten in the window", so as to instruct the user to adjust the sitting posture. The kitten may be the marker 23. The position of the marker 23 on the display device may correspond to the position of the head of the user. The window may be the position adjustment box 22.

In S203, it is determined whether the moving range of the marker is within the preset range; if yes, S204 is executed; if not, S202 is executed.

In this embodiment, the preset range may be a preset moving range of the head. In this step, whether the sitting posture of the user is standard may be determined by determining whether the moving range of the marker is within the preset range. It may be understood that the position of the marker may reflect the position of the head of the user, so that the sitting posture of the user may be determined by determining the moving range of the marker. When the user moves, the position of the marker on the display device also moves accordingly. When the moving range of the marker is within the preset range, the sitting posture of the user may be considered to be standard.

In general, if the moving range of the marker is always within the preset range in preset times or preset time, S204 may be executed. Otherwise, it can indicate that the current sitting posture of the user does not meet conditions. The user may be reminded to adjust the sitting posture, and the marker continues to be configured at the position corresponding to the position of the head of the user on the display device. In other words, S202 is executed until the moving range of the marker is within the preset range. It should be noted that, in order to avoid calculation errors, S204 may also be executed in a case where the times of moving range of the marker within the preset range is greater than a certain value.

In S204, user location information is acquired.

The approach of acquiring the user location information is not limited here. In this step, the user location information may be acquired by a position sensor, or the user location information may be acquired by analyzing a user image. The acquired user location information may be used for determining the calibrated information of the server.

In S205, at least two calibration points are displayed according to a preset rule.

In general, locations, shapes and number of the calibration points may be preset. After the adjustment of the sitting posture of the user is completed, in this step, preset calibration points may be displayed according to the preset rule. The number of the calibration points may be at least two. It may be understood that the more calibration points there are, the more accurate the calibrated information will be. The preset rule may be a preset display rule of the calibration points. For example, the calibration points are displayed in turn or at the same time. It may be understood that the respective calibration points may be located at different positions of the display device to facilitate more accurate calibration of the gaze point of the user.

Figure 2C:
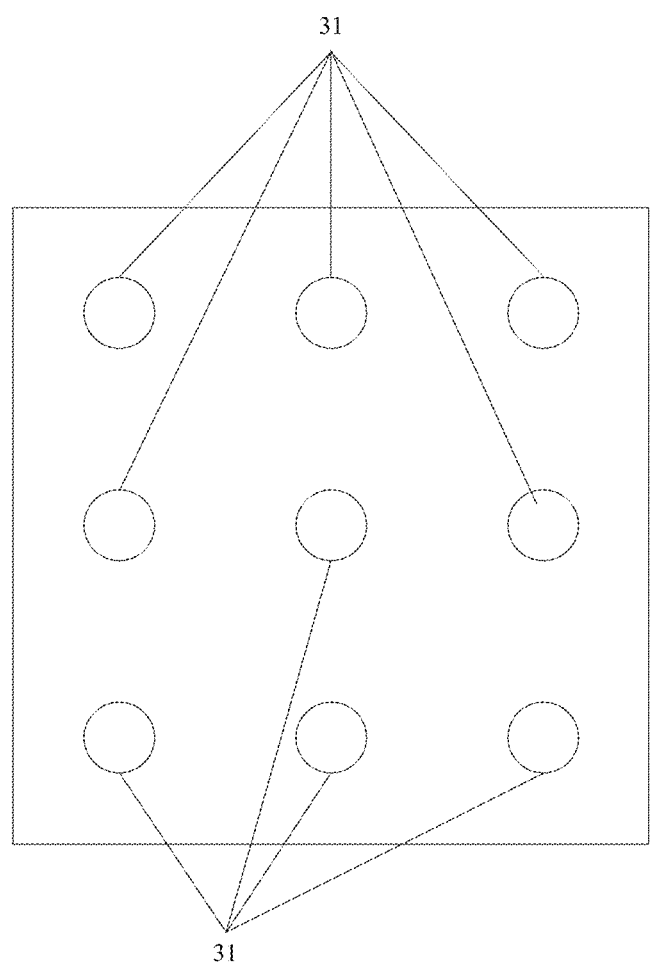
FIG. 2C is a schematic diagram of positions of calibration points in a calibration interface provided by the embodiment 2 of the present disclosure.

FIG. 2C is a schematic diagram of positions of calibration points in the calibration interface provided by the embodiment 2 of the present disclosure. As shown in FIG. 2C, respective calibration points 31 may be located at different positions of the display device. More specifically, the respective calibration points 31 may be uniformly distributed on the display device.

During the calibration, in this step, the respective calibration points in FIG. 2C may be displayed in turn for the user to stare at. It may be understood that a display order of the respective calibration points 31 is not limited. The respective calibration points 31 may be displayed in turn from top left to the bottom right of the display interface, or any calibration point 31 may be selected to display. The respective calibration points 31 may also be displayed in turn from the calibration point 31 in the middle of the display device.

In S206, eye feature information when the user looks at each of the calibration points is acquired.

When the calibration points are displayed on the display device, in this step, the eye feature information when the user looks at respective calibration points may be acquired. When the calibration points are displayed in turn on the display device, in this step, the eye feature information when the user looks at respective calibration points may be acquired in turn. The eye feature information corresponds to the actual gaze point of the user. It may be understood that the eye feature information may be saved in a case where the eye feature information when the user looks at respective calibration points is acquired.

In S207, in a case where the eye feature information corresponding to respective calibration points is acquired, the user location information, the eye feature information and the corresponding calibration marking information are sent to the server.

In this step, the eye feature information corresponding to the calibration points may be understood as, in a case where the calibration points are displayed, the acquired eye feature information when the user looks at the calibration points.

In a case where the eye feature information corresponding to all preset calibration points is acquired, that is, the user looks at all preset calibration points and the eye feature information when the user looks at all calibration points is acquired. In this step, the acquired user location information, the eye feature information corresponding to the respective calibration points and the corresponding calibration marking information may be sent to the server for calibration calculation. In this step, the calibration marking may be the calibration points. Accordingly, the calibration marking information may be calibration point information.

In addition, in this step, after the eye feature information corresponding to each calibration point is acquired, this eye feature information and the calibration marking information and the user location information corresponding to the eye feature information are sent to the server. It may be understood that the user location information may be sent to the server only once. For example, the user location information may be sent to the server when the user eye feature information and the calibration marking information are sent to the server for the first time in the calibration process, or when the last eye feature information and the calibration marking information corresponding to the last eye feature information are sent to the server.

It may be understood that, in a case where no communication connection is established between the terminal equipment and the server, the terminal equipment may first send a connection request to the server. After the communication connection between the terminal equipment and the server is established, the user location information, the eye feature information corresponding to the respective calibration points and the corresponding calibration marking information are sent to the server.

In S208, the calibrated information from the server is received, where the calibrated information includes correspondence among actual gaze points corresponding to the eye feature information, the user location information and the calibration points.

In this step, the calibrated information may be a calibration result. The server sends the calibration result to the terminal equipment for gaze tracking based on the calibration result.

Figure 2D:
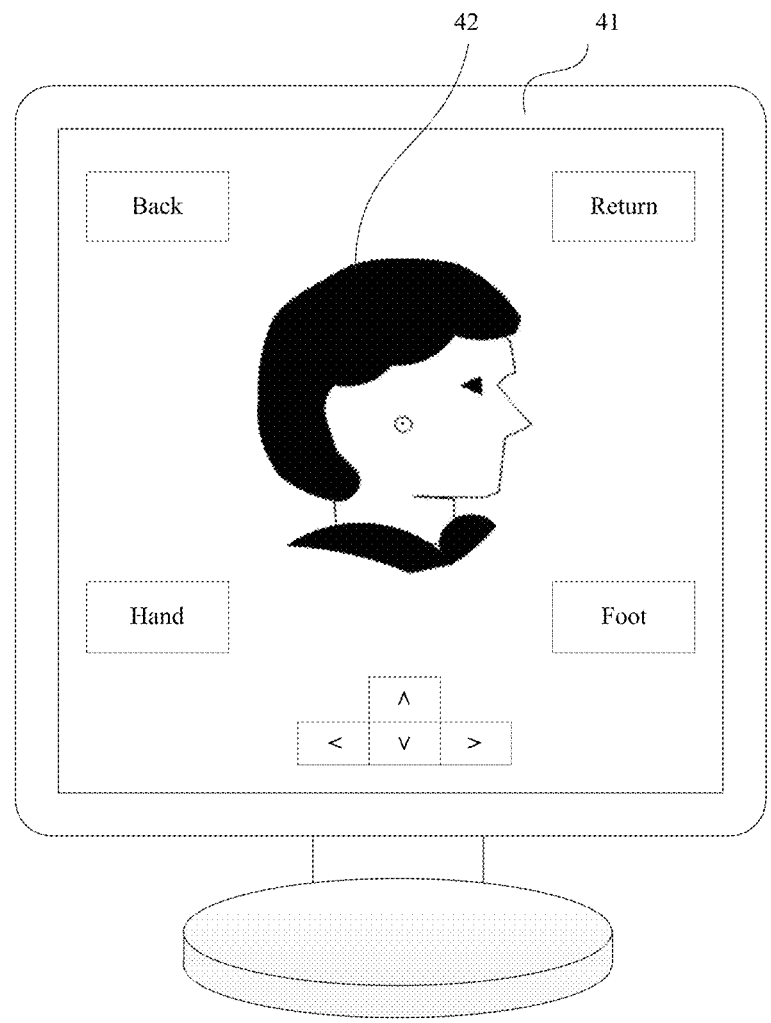
FIG. 2D is a schematic diagram illustrating a scene of gaze point tracking based on calibrated information provided by the embodiment 2 of the present disclosure.

FIG. 2D is a schematic diagram illustrating a scene of gaze point tracking based on the calibrated information provided by the embodiment 2 of the present disclosure. After the calibrated information sent by the server is received, the terminal equipment may conduct the gaze point tracking based on the calibrated information. As shown in FIG. 2D, a terminal equipment 41 displays an operation object 42 and various operation buttons, such as ">", "<", "Back", "Hand", "Foot" and "Return". When the calibrated information includes the calibration result, the terminal equipment 41 may acquire the user information through the eye-tracking device and then determine points that the user actually wants to operate based on the calibrated information, so as to implement human-machine interaction.

The embodiment 2 of the present disclosure provides the calibration method. The calibration method is optimized to add an operation for determining the user location information and an operation for displaying the initial calibration interface, and to embody an operation for acquiring information and an operation for sending information. Through the calibration method, the initial calibration interface may be displayed after the start operation is initiated, so as to further monitor the calibration instruction to determine whether to initiate the calibration operation. In the calibration process, the terminal equipment first identifies the position of the head of the user through the position of the marker, so as to implement the adjustment of the sitting posture of the user. After the sitting posture is adjusted, the eye feature information when the user looks at each of the calibration points is acquired. After the eye feature information corresponding to the respective preset calibration points is acquired, the user location information, the eye feature information corresponding to the respective calibration points and the corresponding calibration marking information may be sent to the server for calibration calculation. Then the calibrated information from the server is received to complete the calibration. On the basis of saving computing resources of the terminal equipment and improving the confidentiality of calibration algorithm, the calibration method can acquire the user information and the calibration marking information more accurately, and improve the accuracy of gaze point calibration.

Embodiment 3

Figure 3:
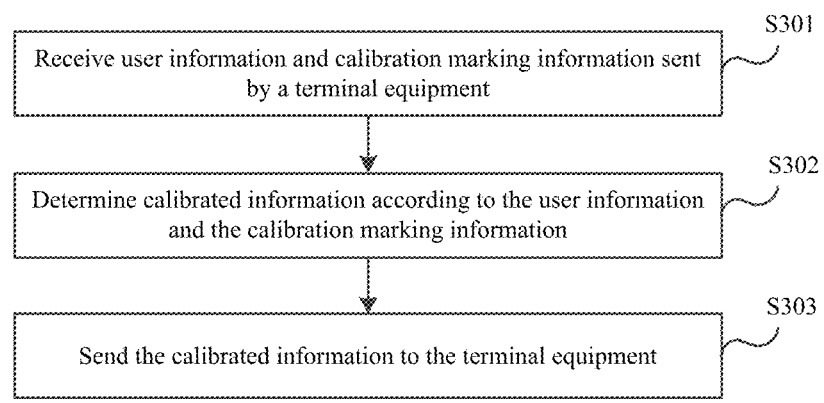
FIG. 3 is a flowchart of a calibration method provided by an embodiment 3 of the present disclosure.

FIG. 3 is a flowchart of a calibration method provided by the embodiment 3 of the present disclosure. The calibration method may be applied to calibration of an eye-tracking product before a user uses the eye-tracking product. The calibration method may be performed by a calibration apparatus, which may be implemented by software and/or hardware and is generally integrated into a terminal equipment. In this embodiment, the terminal equipment includes, but is not limited to, a computer. The computer may have a better configuration, such as higher data processing capacity, compared to the computer executing embodiment 1.

As shown in FIG. 3, the embodiment 3 of the present disclosure provides a calibration method.

The calibration method includes steps described below.

In S301, user information and calibration marking information sent by a terminal equipment are received.

In this embodiment, the user information may be understood as feature data of the user in the calibration process. The feature data may be used for determining actual gaze points, an actual fixation area or an actual fixation track when the user looks at calibration points, a calibration area or a calibration track. The user information may include eye feature information and user location information. The user information may also include only the eye feature information. The eye feature information may be understood as eye data acquired by an eye-tracking device in the calibration process. The user location information may be understood as a location of the user relative to the eye-tracking product in the calibration process. The actual gaze points may be understood as points that line-of-sight of the user actually looks at on a display device in the calibration process. The calibration marking information may be understood as data used for identifying a calibration marking. The calibration marking information may include position information and depth information of the calibration marking. The calibration marking may be the calibration points, the calibration area or the calibration track.

In this step, the user information and the calibration marking information sent by the terminal device may be received for calibration calculation.

In S302, calibrated information is determined according to the user information and the calibration marking information.

In this step, at least one of the actual gaze points, the fixation area or the fixation track of the user are first determined based on the user information, and then the correspondence between the calibration marking information and at least one of the actual gaze points, the fixation area or the fixation track is established to determine the calibrated information. The user information may also include the user location information, and the user location information may be combined with the above to determine the calibrated information.

Specific technical means that determine the correspondence are not limited here, and those skilled in the art may determine the correspondence according to actual requirements. For example, the actual gaze points, the user location information and the calibration points may be imported into a gaze point estimation model to determine to-be-solved calibration parameters, so as to acquire the correspondence among the actual gaze points, the user location information and the calibration points.

The eye feature information may include at least one of eye image information, a pupil position, a pupil shape, an iris position, an iris shape, an eyelid position, a canthus position or spot (also known as Purkinje spot) position. Specific technical means that determine the actual gaze points of the user based on eye features are not limited here. Those skilled in the art may determine the at least one of the actual gaze points, the fixation area or fixation track based on the corresponding technical means determined by specific content included in the eye feature information.

For example, the actual gaze points of the user may be determined by analyzing the relative position between a pupil feature and a spot feature of the user. The actual gaze points of the user may also be determined by the relative position information between an iris feature and a spot feature of the user.

In S303, the calibrated information is sent to the terminal equipment.

After the calibrated information is determined, in this step, the calibrated information may be sent to the terminal equipment, and the terminal equipment may use the eye-tracking product for assistive communication based on the calibrated information. The calibrated information may include at least one of a calibration result, a calibrated image or a next operation interface. The calibration result may include correspondence among the actual gaze points (i.e. the gaze points determined by the eye feature information of the user), the user location information and the calibration points.

Further, the step in which the calibrated information is determined according to the user information and the calibration marking information includes steps described below.

Mapping between the actual gaze points and the calibration points corresponding to the user information is determined according to the actual gaze points and the calibration marking information.

The calibrated information is determined according to the user location information and the mapping.

When the calibrated information is determined, the mapping between the actual gaze points and the calibration points may be first determined based on the actual gaze points and the calibration marking information corresponding to the user information. Then correspondence between the mapping and the user location information are established to obtain the calibrated information. The user location information may be included in the user information. The user location information is included in the user information, or may be sent together with the user information and the calibration marking information sent by the terminal device to the server. Accordingly, the calibrated information may include the correspondence among the actual gaze points, the user location information and the calibration points.

For example, in this step, position information of the actual gaze points and the calibration marking information may be imported into a preselected mapping model to obtain mapping parameters, so as to obtain the mapping between the actual gaze points and the calibration points; or, position deviation between respective actual gaze points and the calibration marking information corresponding to the respective actual gaze points may be calculated to obtain the mapping between the actual gaze points and the calibration points. In this step, when the calibrated information is determined according to the user location information and the mapping, a correspondence table of the user location information and the mapping may be directly established to obtain the calibrated information.

The embodiment 3 of the present disclosure provides the calibration method. Through the above calibration method, the calibrated information can be determined based on the received user information and the calibration marking information, and then the calibrated information can be sent to the terminal equipment, so as to save computing resources for the information calculation of the terminal equipment after the calibration. The calibration method increases processing efficiency of the terminal equipment and improves user experience in use of the terminal equipment. In addition, calibration calculation through the server side can significantly increase the confidentiality of calibration algorithm.

Embodiment 4

Figure 4A:
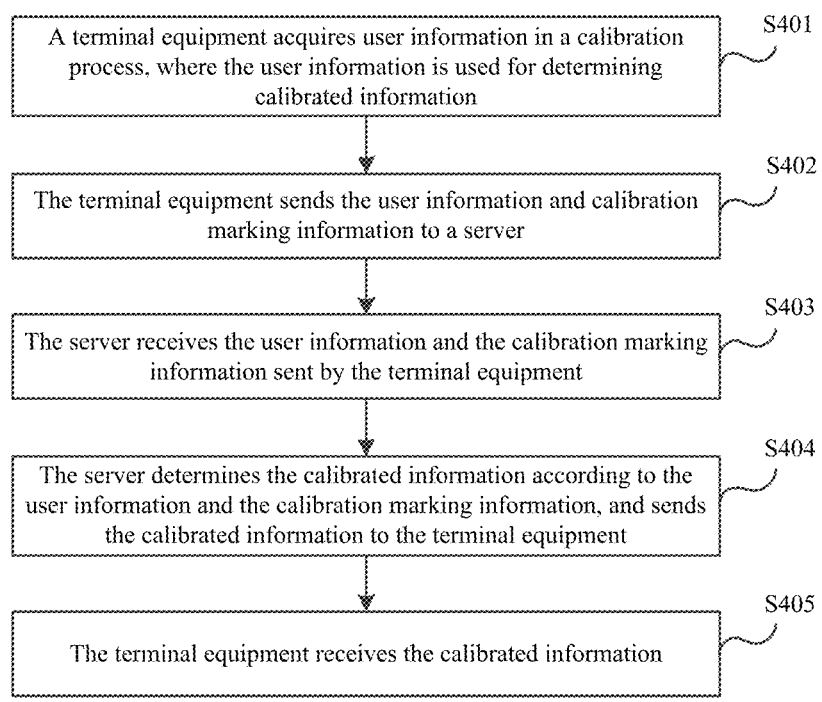
FIG. 4A is a flowchart of a calibration method provided by an embodiment 4 of the present disclosure.

FIG. 4A is a flowchart of a calibration method provided by the embodiment 4 of the present disclosure. This embodiment embodies an interaction process of a terminal equipment and a server on the basis of the above embodiments. This embodiment may be applied to a case where gaze point calibration is completed through interaction between the terminal equipment and the server.

As shown in FIG. 4A, the embodiment 4 of the present disclosure provides the calibration method. The calibration method includes steps described below.

In S401, a terminal equipment acquires user information in a calibration process, where the user information is used for determining calibrated information.

In S402, the terminal equipment sends the user information and calibration marking information to a server.

In S403, the server receives the user information and the calibration marking information sent by the terminal equipment.

In S404, the server determines the calibrated information according to the user information and the calibration marking information, and sends the calibrated information to the terminal equipment.

In S405, the terminal equipment receives the calibrated information.

Basic conditions required in this embodiment include the terminal equipment with an eye tracking device integrated, the server with a calibration algorithm stored, and the calibration algorithm including an eye-tracking algorithm for calculating gaze points. When the calibrated information is applied in the terminal equipment to determine the gaze points, the terminal equipment may further include software for assistive communication and test analysis. The software may call the gaze points to implement interaction between eyes and a display device. The software may assists in determining the gaze point of user.

In general, when the user first uses an eye-tracking product, the gaze points of the user need to be calibrated. After the calibration starts, the terminal equipment may display an initial calibration interface, and display the calibration points in turn and simultaneously save the user information when the user looks at each of the calibration points. After the calibration points are displayed, the data obtained in the calibration process is packaged and sent to the server for calibration calculation, saving the computing resources of the terminal equipment, saving time and effort, and increasing user experience. After the server obtains the calibrated information (the calibrated information calculated by the server to facilitate the upgrade of calculation calibration algorithm and increase the confidentiality of the calibration algorithm), the calibrated information is sent to the terminal equipment. The user may use the eye-tracking product based on the calibrated information.

It may be understood that, in the calibration process, the corresponding data of the terminal equipment are saved; and after the calibration points are displayed, all data (i.e. the calibration marking information and the user information) is sent to the server; the server calculates and sends the calibrated information to the terminal equipment.

In this embodiment, specific operations for completing the calibration through the interaction between the terminal equipment and the server may be referred to the above embodiments, which will not be described here.

Figure 4B:
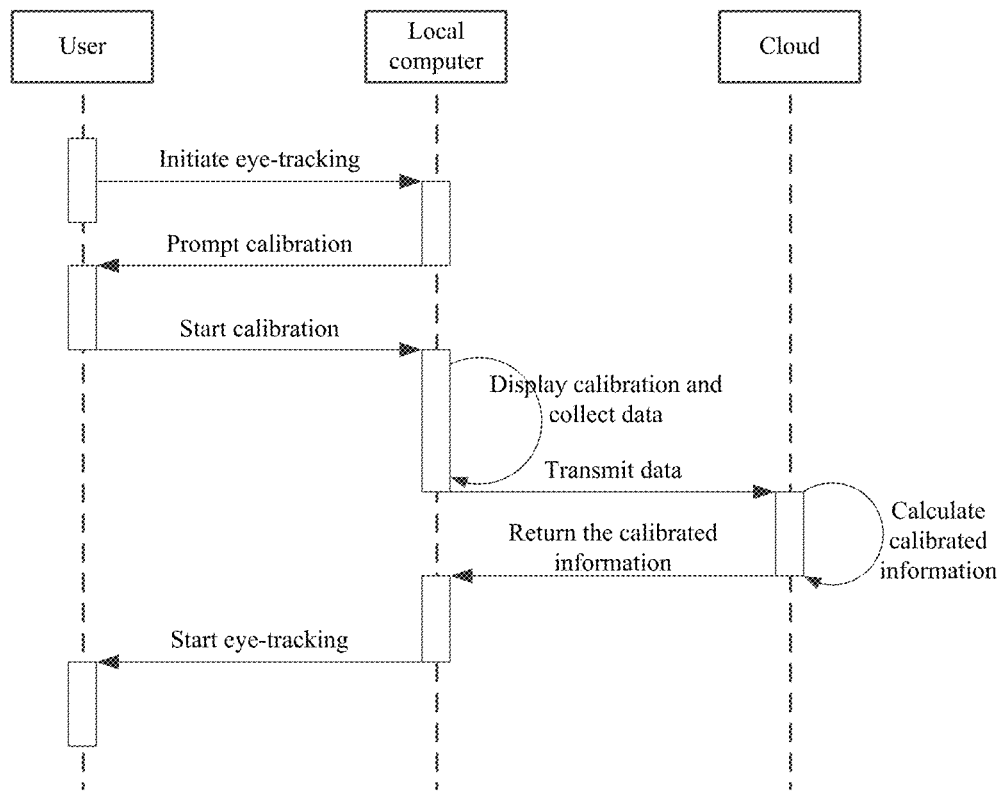
FIG. 4B is a calibration sequence diagram provided by the embodiment 4 of the present disclosure.

FIG. 4B is a calibration sequence diagram provided by the embodiment 4 of the present disclosure. As shown in FIG. 4B, the user may initiate eye-tracking at first, and a local computer (i.e. the terminal equipment) may monitor an initiation instruction and prompt the calibration through the initial calibration interface. The user triggers a calibration instruction to initiate a calibration operation. The local computer monitors the calibration instruction, displays calibration and collects data, that is, the calibration points are displayed by the display device, and then the user information when the user looks at the calibration points is acquired. After the user information corresponding to all calibration points is acquired, the local computer may send the user information and the calibration marking information to a cloud (i.e. the server). After receiving data delivered by the local computer, the server calculates the calibrated information and returns the calibrated information to the local computer. The local computer receives the calibrated information and notifies the user of start of the eye-tracking.

The embodiment 4 of the present disclosure provides the calibration method. Through the above calibration method, the calibration of the gaze point of user is completed through the interaction between the terminal equipment and the server. Calibration calculation through the server can significantly save the computing resources of the terminal equipment and increase the processing efficiency of the terminal equipment. In addition, calibration calculation through the server can significantly increase the confidentiality of calibration algorithm and reduce calculation time of the calibrated information.

Embodiment 5

Figure 5:
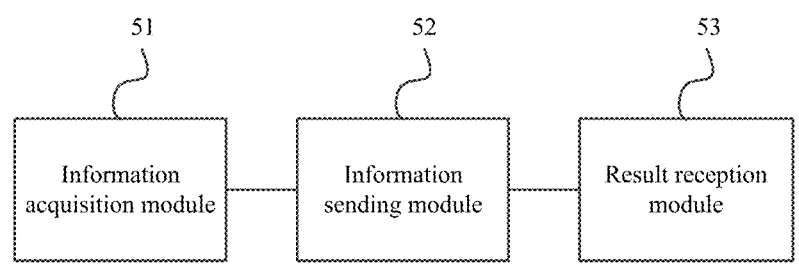
FIG. 5 is a structural diagram of a calibration apparatus provided by an embodiment 5 of the present disclosure.

FIG. 5 is a structural diagram of a calibration apparatus provided by the embodiment 5 of the present disclosure. The calibration apparatus may be applied to calibration before a user uses an eye-tracking product. The calibration apparatus may be implemented by software and/or hardware and is generally integrated into a terminal equipment.

As shown in FIG. 5, the calibration apparatus includes an information acquisition module 51, an information sending module 52 and a result reception module 53.

The information acquisition module 51 is configured to acquire user information in a calibration process. The user information is used for determining calibrated information.

The information sending module 52 is configured to send the user information and calibration marking information to a server.

The result reception module 53 is configured to receive the calibrated information from the server.

In this embodiment, the calibration apparatus first acquires the user information in the calibration process through the information acquisition module 51, the user information being used for determining the calibrated information; then the calibration apparatus sends the user information and the calibration marking information to the server through the information sending module 52; and the calibration apparatus finally receives the calibrated information from the server through the result reception module 53.

This embodiment provides the calibration apparatus. The calibration apparatus may acquire the user information when the user looks at the calibration points; then send the user information and the calibration marking information corresponding to the user information to the server, enabling the server to determine the calibrated information based on the user information and the calibration marking information corresponding to the user information; and finally receive the calibrated information from server to complete the gaze point calibration. The calibration method significantly saves computing resources of the terminal equipment, increases the processing efficiency of the terminal equipment, and improves user experience in use of the terminal equipment. In addition, calibration calculation through the server can facilitate the upgrade of the calibration algorithm. Meanwhile, the calibration algorithm is stored in the server, significantly increasing the confidentiality of the calibration algorithm.

Further, the calibration apparatus in this embodiment is optimized to include a marker configuration module and a location acquisition module.

The marker configuration module is configured to initiate a calibration operation, and provide a marker. The marker is configured at a position corresponding to a head of the user on a display device.

The location acquisition module is configured to acquire user location information in a case where a moving range of the marker is within a preset range.

On the basis of the above optimization, the information acquisition module 51 is specifically configured to display at least two calibration points according to a preset rule and acquire eye feature information when the user looks at each of the calibration points.

Based on the present disclosure, the information sending module 52 is specifically configured to send the user location information, the eye feature information corresponding to the respective calibration points and the calibration marking information to the server in a case where the eye feature information corresponding to respective calibration points is acquired. The calibrated information comprises correspondence among actual gaze points corresponding to the eye feature information, the user location information and the calibration points.

Further, the calibration apparatus in this embodiment is optimized to include a calibration interface display module.

The calibration interface display module is configured to initiate a start operation and display an initial calibration interface.

The above calibration apparatus may perform the calibration method provided by the embodiment 1 or the embodiment 2 of the present disclosure and have the corresponding functional modules and beneficial effects for implementing the calibration method.

Embodiment 6

Figure 6:
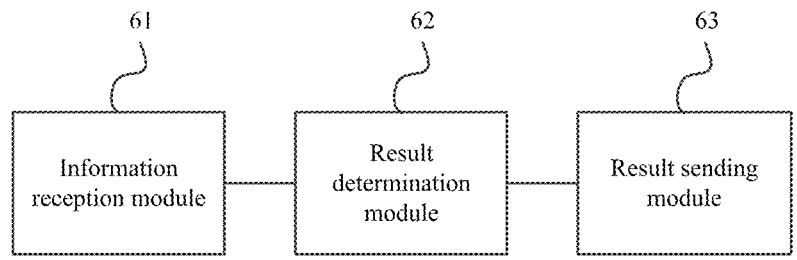
FIG. 6 is a structural diagram of a calibration apparatus provided by an embodiment 6 of the present disclosure.

FIG. 6 is a structural diagram of a calibration apparatus provided by the embodiment 6 of the present disclosure. The calibration apparatus may be applied to calibration before a user uses an eye-tracking product. The calibration apparatus may be implemented by software and/or hardware and generally integrated into a terminal equipment.

As shown in FIG. 6, the calibration apparatus includes an information reception module 61, a result determination module 62 and a result sending module 63.

The information reception module 61 is configured to receive user information and calibration marking information sent by a terminal equipment.

The result determination module 62 is configured to determine calibrated information according to the user information and the calibration marking information.

The result sending module 63 is configured to send the calibrated information to the terminal equipment.

In this embodiment, the calibration apparatus first receives the user information and the calibration marking information sent by the terminal equipment through the information reception module 61; then determines the calibrated information according to the user information and the calibration marking information through the result determination module 62; and finally sends the calibrated information to the terminal equipment through the result sending module 63.

This embodiment provides the calibration apparatus. The calibration apparatus can determine the calibrated information based on the received user information and the calibration marking information, and send the calibration information to the terminal equipment after determining the calibrated information, so as to save computing resources of the terminal equipment for calculating the calibrated information. The calibration apparatus increases processing efficiency of the terminal equipment, and improves user experience in use of the terminal equipment. In addition, calibration calculation through the server side can significantly increase the confidentiality of calibration algorithm.

Further, the result sending module 63 is specifically configured to determine mapping between actual gaze points and calibration points according to the actual gaze points and the calibration marking information corresponding to the user information, and determine the calibrated information according to user location information and the mapping.

In this embodiment, the above calibration apparatus may perform the calibration method provided by the embodiment 3 of the present disclosure and have the corresponding functional modules and beneficial effects for implementing the calibration method.

Embodiment 7

Figure 7:
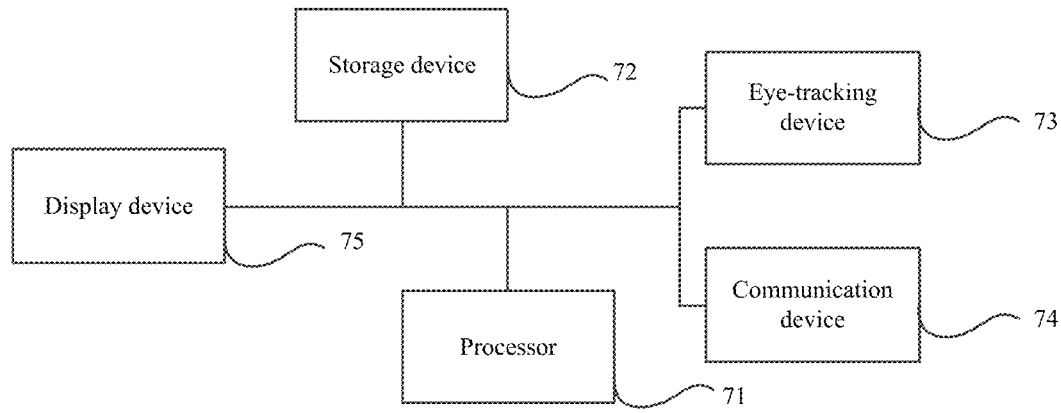
FIG. 7 is a structural diagram of a terminal equipment provided by an embodiment 7 of the present disclosure.

FIG. 7 is a structural diagram of a terminal equipment provided by the embodiment 7 of the present disclosure. As shown in FIG. 7, the terminal equipment provided by the embodiment 7 includes at least one processor 71, a storage device 72, an eye-tracking device 73, a communication device 74 and a display device 75.

The terminal equipment may include at least one processor 71. One processor 71 is taken as an example in FIG. 7. The storage device 72 is configured to store at least one program. The at least one program, when executed by the at least one processor 71, causes the at least one processor 71 to implement the calibration method described in the embodiment 1 or the embodiment 2 of the present disclosure. The eye-tracking device 73 is connected to the processor 71 and the storage device 72 respectively, and is configured to acquire user information in a calibration process. The communication device 74 is connected to the processor 71 and the storage device 72 respectively, and is configured to send the user information and calibration marking information to a server, and receive calibrated information from the server. The display device 75 is connected to the processor 71 and the storage device 72 respectively, and is configured to display a marker, a calibration point and an initial calibration interface.

The processor 71, the storage device 72, the eye-tracking device 73, the communication device 74 and the display device 75 in the terminal equipment may be connected to each other through a bus or other means. The bus is taken as an example in FIG. 7.

The storage device 72, as a computer readable storage medium, in the terminal equipment may be configured to store at least one program. The program may be a software program, a computer executable program and module. For example, the program may be a program instructions or module (for example, the information acquisition module 51, the information sending module 52 and the result reception module 53 included in the calibration apparatus shown in FIG. 5) corresponding to the calibration method provided by the embodiment 1 or the embodiment 2 of the present disclosure. The processor 71 performs various functional applications and data processing of the terminal equipment, i.e., the calibration method in the embodiment 1 or the embodiment 2 described above, by executing software programs, instructions and modules stored in the storage device 72.

The storage device 72 may include a program storage area and a data storage area. The program storage area may store an operation system and an application required for implementing at least one function. The data storage area may store data created according to the usage of the terminal equipment and so on. In addition, the storage device 72 may include at least one of a high-speed random-access memory or include a non-volatile memory, such as at least one magnetic disk storage, flash memory, or other non-volatile solid-state storage. In some instances, the storage device 72 may further include a memory arranged remotely relative to the processor 71. The remote memory may be connected to the terminal equipment through a network. Examples of the above network include, but is not limited to, the Internet, an intranet, a local area network (LAN), a mobile communication network and combinations thereof.

The eye-tracking device 73 may be configured to acquire the user information in the calibration process. The terminal equipment may also include an input device. The input device may receive input digital or character information, and generate key signal input related to user settings and function control of the terminal equipment. The communication device 74 may be configured to send the user information and the calibration marking information to the server and receive the calibrated information from the server. The display device 75 may be configured to display the marker, the calibration points and the initial calibration interface. In addition, the terminal equipment may also include an output device. The output device may include a playing device such as a loudspeaker.

In addition, the at least one program included in the terminal equipment, when executed by the at least one processor 71, implements operations described below.

The user information in the calibration process is acquired, the user information being used for determining the calibrated information. The user information and the calibration marking information are sent to the server. The calibrated information from the server is received.

Embodiment 8

Figure 8:
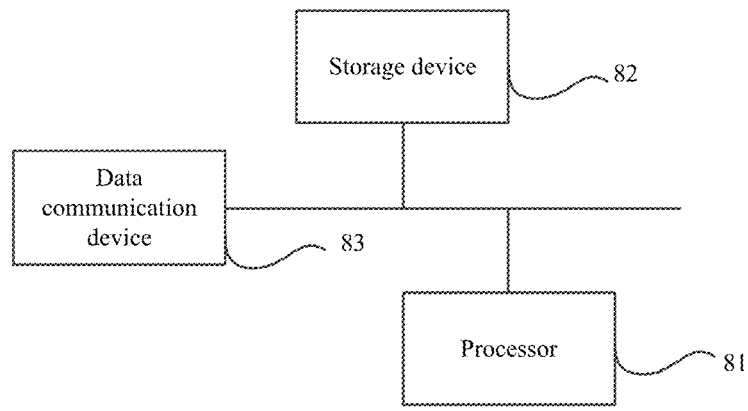
FIG. 8 is a structural diagram of a server provided by an embodiment 8 of the present disclosure.

FIG. 8 is a structural diagram of a server provided by the embodiment 8 of the present disclosure. As shown in FIG.

8, the server provided by the embodiment 8 of the present disclosure includes at least one processor 81, a storage device 82 and a data communication device 83.

The server may include at least one processor 81. One processor 81 is taken as an example in FIG. 8. The storage device 82 is configured to store at least one program. The at least one program, when executed by the at least one processor 81, causes the at least one processor 81 to implement the calibration method described in the embodiment 3 of the present disclosure. The data communication device 83 is connected to the processor 81 and the storage device 82 respectively, and is configured to receive user information and calibration marking information sent by a terminal equipment, and send calibrated information to the terminal equipment. The processor 81, the storage device 82 and the data communication device 83 in the server may be connected to each other through a bus or other means. The bus is taken as an example in FIG. 8.

The storage device 82, as a computer readable storage medium, in the server may be configured to store at least one program. The program may be a software program, a computer executable program and module. For example, the program may be a program instruction or module (for example, the information reception module 61, the result determination module 62 and the result sending module 63 included in the calibration apparatus shown in FIG. 6) corresponding to the calibration method provided by the embodiment 3 of the present disclosure. The processor 81 performs various functional applications and data processing of the server, i.e., the calibration method in the embodiment 3 described above, by executing software programs, instructions and modules stored in the storage device 82.

The storage device 82 may include a program storage area and a data storage area. The program storage area may store an operation system and an application required for implementing at least one function. The data storage area may store data created according to the usage of the terminal equipment and so on. In addition, the storage device 82 may include at least one of a high-speed random-access memory or a non-volatile memory, such as at least one magnetic disk storage, flash memory, or other non-volatile solid-state storage. In some instances, the storage device 82 may further include a memory arranged remotely relative to processor 81. The remote memory may be connected to a server through a network. Examples of the above networks include, but are not limited to, the Internet, an intranet, a local area network (LAN), a mobile communication network and combinations thereof.

The data communication device 83 in the server may receive the user information and the calibration marking information sent by the terminal equipment, and send the calibrated information to the terminal equipment. In addition, the server may also include an input device and an output device. The input device may be configured to receive input digital or character information, and generate key signal inputs related to user settings and function control of the server. The input device may include devices, for example, a key, a microphone and/or a camera. The output device may include devices, for example, a display screen and/or a loudspeaker.

In addition, the at least one program included in the server, when executed by the at least one processor 71, implements operations described below.

The user information and the calibration marking information sent by a terminal equipment are received. The calibrated information is determined according to the user information and the calibration marking information. The calibrated information is sent to the terminal equipment.

Embodiment 9

The embodiment 9 of the present disclosure provides a computer readable storage medium, on which computer programs are stored. The computer programs, when executed by a processor, implement the calibration method provided by the embodiment 1 of the present disclosure. The calibration method includes steps described below.

User information in a calibration process is acquired, the user information being used for determining calibrated information. The user information and calibration marking information is sent to a server. The calibrated information from the server is received.

In an embodiment, the computer programs, when executed by the processor, may also be configured to perform the calibration method provided by the embodiment 2 of the present disclosure.

The computer storage medium of this embodiment of the present disclosure may be any combination of at least one computer readable medium. The computer readable medium may be a computer readable signal medium or a computer readable storage medium. The computer readable storage medium such as, but is not limited to, a system, apparatus or device of an electrical, magnetic, optical, electromagnetic, infrared or semiconductor type, or any combination thereof. More specific examples (non-exhaustive list) of computer readable storage medium include an electrical connection of at least one wire, a portable computer disk, a hard disk, a Random Access Memory (RAM), a Read Only Memory (ROM), an Erasable Read Only Memory (EPROM), a flash memory, an optical fiber, a portable Compact Disc Read-Only Memory (CD-ROM), an optical storage device, a magnetic storage device, or any appropriate combination thereof. The computer readable storage medium may be any tangible medium including or storing a program. The program may be used by or in combination with an instruction execution system, apparatus or device.

The computer readable signal medium may include a data signal propagating in a baseband or on part of a carrier. The data signal carries computer readable program codes. Such data signal may be propagated in many forms, which include, but not limited to, an electromagnetic signal, an optical signal or any appropriate combination thereof. The computer readable signal medium may also be any computer readable medium other than the computer readable storage medium. The computer readable medium may send, propagate, or transmit programs used by or in combination with an instruction execution system, apparatus or device.

The program codes included in the computer readable medium may be transmitted over any appropriate medium. The appropriate medium includes, but is not limited to, wireless, wire, optic cable, Radio Frequency (RF), and any appropriate combination thereof.

At least one programming language or their combinations may be used for writing computer program codes for performing the operations of the present disclosure. The programming language includes object-oriented programming language, such as Java, Smalltalk, C++, and includes conventional procedural programming language, such as "C" or a similar programming language. The program codes may be fully executed on a computer of the user, partially executed on the computer of the user, executed as a separate software package, partially executed on the computer of the user and partially executed on a remote computer, or fully executed on the remote computer or a server. In the case of the remote computer, the remote computer may be connected to the computer of the user through any kind of network, including a local area network (LAN) or a wide area network (WAN), or the remote computer may be connected to an external computer (for example, using an internet service provider to connect to the external computer through the Internet).

Embodiment 10

The embodiment 10 of the present disclosure provides a computer readable storage medium, on which computer programs are stored. The computer programs, when executed by a processor, implement the calibration method provided by the embodiment 3 of the present disclosure. The calibration method includes steps described below.

User information and calibration marking information sent by a terminal equipment are received. Calibrated information is determined according to the user information and the calibration marking information. The calibrated information is sent to the terminal equipment.

The computer storage medium of this embodiment of the present disclosure may be any combination of at least one computer readable medium. The computer readable medium may be a computer readable signal medium or a computer readable storage medium. The computer readable storage medium such as, but is not limited to, a system, apparatus or device of an electrical, magnetic, optical, electromagnetic, infrared or semiconductor type, or any combination thereof. More specific examples (non-exhaustive list) of computer readable storage medium include an electrical connection of at least one wire, a portable computer disk, a hard disk, a Random Access Memory (RAM), a Read Only Memory (ROM), an Erasable Read Only Memory (EPROM), a flash memory, an optical fiber, a portable Compact Disc Read-Only Memory (CD-ROM), an optical storage device, a magnetic storage device, or any appropriate combination thereof. The computer readable storage medium may be any tangible medium including or storing a program. The program may be used by or in combination with an instruction execution system, apparatus or device.

The computer readable signal medium may include a data signal propagating in a baseband or on part of a carrier. The data signal carries computer readable program code. Such data signal may be propagated by many forms, which include, but not limited to, an electromagnetic signal, an optical signal or any appropriate combination thereof. The computer readable signal medium may also be any computer readable medium other than the computer readable storage medium. The computer readable medium may send, propagate, or transmit programs used by or in combination with an instruction execution system, apparatus or device.

The program code included in the computer readable medium may be transmitted over any appropriate medium. The appropriate medium includes, but is not limited to, wireless, wire, optic cable, Radio Frequency (RF), and any appropriate combination thereof.

At least one programming language or their combinations may be used for writing computer program code for performing the operations of the present disclosure. The programming language includes object-oriented programming language, such as Java, Smalltalk, C++, and includes conventional procedural programming language, such as "C" or a similar programming language. The program code may be fully executed on a computer of the user, partially executed on the computer of the user, executed as a separate software package, partially executed on the computer of the user and partially executed on a remote computer, or fully executed on the remote computer or a server. In the case of the remote computer, the remote computer may be connected to the computer of the user through any kind of network, including a local area network (LAN) or a wide area network (WAN), or the remote computer may be connected to an external computer (for example, using an internet service provider to connect to the external computer through the Internet).

It should be noted that the above are only better embodiments of the present disclosure and technical principles applied in the present disclosure. Those skilled in the art will understand that the present disclosure is not limited to the specific embodiments described herein. For those skilled in the art, various obvious changes, readjustments and substitutions may be conducted without departing from the protection scope of the present disclosure. Therefore, although the present disclosure is described in detail through the above embodiments, without departing from the conception of the present disclosure, the present disclosure may include more equivalent embodiments. The scope of the present disclosure is determined by the scope of accompanying claims.

What is claimed is:

1. A calibration method, comprising:
    acquiring user information, wherein the user information comprises user location information and eye feature information and is used for determining calibrated information;
    sending the user information and calibration marking information to a server to determine the calibrated information according to the user location information and mapping between actual gaze points corresponding to the eye feature information and calibration points corresponding to the calibration marking information; and
    receiving the calibrated information from the server.

2. The method of claim 1, wherein before acquiring the user information, the method further comprises:
    initiating a calibration operation, and providing a marker, wherein the marker is configured at a position corresponding to a head of a user on a display device; and
    in response to determining that a moving range of the marker is within a preset range, acquiring user location information.

3. The method of claim 2, wherein acquiring the user information comprises:
    displaying at least two calibration points according to a preset rule; and
    acquiring eye feature information when the user looks at each of the calibration points.

4. The method of claim 3, wherein sending the user information and the calibration marking information to the server comprises:
    in response to determining that the eye feature information corresponding to respective calibration point is acquired, sending the user location information, the eye feature information and the corresponding calibration marking information to the server; wherein the calibrated information comprises correspondence among actual gaze points corresponding to the eye feature information, the user location information and the calibration points.

5. The method of claim 1, wherein before acquiring the user information, the method further comprises:
    initiating a start operation, and displaying an initial calibration interface.

6. A calibration method, comprising:
receiving user information and calibration marking information sent by a terminal equipment, wherein the user information comprises user location information and eye feature information;
determining calibrated information according to the user information and the calibration marking information; and
sending the calibrated information to the terminal equipment;
wherein determining the calibrated information according to the user information and the calibration marking information comprises:
determining mapping between actual gaze points and calibration points according to the actual gaze points and the calibration marking information corresponding to the user information; and
determining the calibrated information according to the user location information and the mapping.

7. A calibration method, comprising:
acquiring, by a terminal equipment, user information, wherein the user information comprises user location information and eye feature information and is used for determining calibrated information;
sending, by the terminal equipment, the user information and calibration marking information to a server;
receiving, by the server, the user information and the calibration marking information sent by the terminal equipment;
determining, by the server, the calibrated information according to the user information and the calibration marking information, and sending the calibrated information to the terminal equipment; and
receiving, by the terminal equipment, the calibrated information;
wherein determining, by the server, the calibrated information according to the user information and the calibration marking information comprises:
determining mapping between actual gaze points and calibration points according to the actual gaze points and the calibration marking information corresponding to the user information; and
determining the calibrated information according to the user location information and the mapping.

8. A calibration apparatus, comprising:
a processor; and
a memory for storing instructions executable by the processor, wherein the processor is configured to implement the calibration method of claim 1.

9. A calibration apparatus, comprising:
a processor; and
a memory for storing instructions executable by the processor, wherein the processor is configured to implement the calibration method of claim 6.

10. A terminal equipment, comprising:
at least one processor;
a storage device, which is configured to store at least one program, wherein the at least one program, when executed by the at least one processor, causes the at least one processor to implement the calibration method of claim 1;
an eye-tracking device, which is configured to acquire user information, wherein the eye-tracking device is connected to the processor and the storage device respectively;
a communication device, which is configured to send the user information and calibration marking information to a server, and receive calibrated information from the server, wherein the communication device is connected to the processor and the storage device respectively; and
a display device, which is configured to display a marker, a calibration point and an initial calibration interface, wherein the display device is connected to the processor and the storage device respectively.

11. The terminal equipment of claim 10, wherein before acquiring the user information, the method further comprises:
initiating a calibration operation, and providing a marker, wherein the marker is configured at a position corresponding to a head of a user on a display device; and
in response to determining that a moving range of the marker is within a preset range, acquiring user location information.

12. The terminal equipment of claim 11, wherein acquiring the user information comprises:
displaying at least two calibration points according to a preset rule; and
acquiring eye feature information when the user looks at each of the calibration points.

13. The terminal equipment of claim 12, wherein sending the user information and the calibration marking information to the server comprises:
in response to determining that the eye feature information corresponding to respective calibration point is acquired, sending the user location information, the eye feature information and the corresponding calibration marking information to the server; wherein the calibrated information comprises correspondence among actual gaze points corresponding to the eye feature information, the user location information and the calibration points.

14. The terminal equipment of claim 10, wherein before acquiring the user information, the method further comprises:
initiating a start operation, and displaying an initial calibration interface.

15. A server, comprising:
at least one processor;
a storage device, which is configured to store at least one program, wherein the at least one program, when executed by the at least one processor, causes the at least one processor to implement the calibration method of claim 6; and
a data communication device, which is configured to receive user information and calibration marking information sent by a terminal equipment, and send calibrated information to the terminal equipment, wherein the data communication device is connected to the processor and the storage device respectively.

16. A non-transitory computer readable storage medium, wherein computer programs are stored in the computer readable storage medium, the computer programs, when executed by a processor, implement the calibration method of claim 1.

17. A non-transitory computer readable storage medium, wherein computer programs are stored in the computer readable storage medium, the computer programs, when executed by a processor, implement the calibration method of claim 6.

* * * * *